Patented Aug. 24, 1954

2,687,353

UNITED STATES PATENT OFFICE 2,687,353

METHOD OF DISCHARGING IRREVERSIBLY DISCHARGEABLE PHOTOGRAPHIC FILTER LAYERS

Vsevolod Tulagin, Binghamton, N. Y., assignor to General Aniline & Film Corporation, New York, N. Y., a corporation of Delaware No Drawing. Application August 9, 1952, Serial No. 303,611

10 Claims. (Cl. 95—2)

1

The present invention relates to irreversibly dischargeable photographic filter and antihalation layers containing as the active filtering agent, a yellow Schiff's base and to a method of discharging such agent by utilizing aqueous solutions of amines having an aliphatic character.

Multilayer color film as presently manufactured is constructed in the form of an integral tripack comprising a base and three superimposed silver halide emulsion layers thereon, sensitized respectively in the order of their arrangement on the base to red, green and blue light.

It is well known that all high speed photographic emulsions are highly sensitive to blue light. However, in multilayer color film, the green and red sensitive emulsions must not respond to exposure by blue light. For this reason, in present day manufacture of such film, there is always present, superimposed on the green sensitive emulsion, a filter layer containing a yellow colorant designed to absorb blue light and prevent its reaching and exposing the green and red sensitive emulsion layers.

The yellow colorant which is so employed must possess certain fundamental characteristics in order to be effective for its intended purpose. In the first place, it must be completely removed during the processing of the film since otherwise, the entire film would be colored yellow and it would be impossible to obtain white or transparent areas. It is also highly desirable that the yellow colorant be non-migratory in the colloid employed as a carrier therefor. Should the colorant migrate from the filter layer to an adjacent silver halide emulsion layer, it would seriously interfere with the spectral sensitivity of such layer and color degradation would inevitably ensue.

The colorant should be a "brilliant" one; that is to say, the colorant should absorb a large percentage of blue light and yet be almost completely transparent in the green and red regions of the spectrum.

Finally, the colorant must be either water soluble or dispersible in an aqueous solution of the colloid serving as the carrier. Manifestly, in the absence of this property, the difficulties encountered in manufacturing the filter layer would overbalance any other desirable properties possessed by the colloid.

In my copending application Ser. No. 200,095, filed December 9, 1950, and entitled "Irreversibly Dischargeable Photographic Filter Layers and Method of Processing Film Containing the Same," I have described a class of minus-blue colorants which can be readily made on a commercial scale and which satisfy all of the above prerequisites. In said application, it is suggested that these yellow colorants be discharged by the utilization of a bath containing a base such as hydroxylamine, hydrazine, semi-carbazide or a salt of one of such bases. It has been found in commercial practice, however, that when utilizing such agents to discharge certain of the yellow dyes of my prior application, unexpected difficulties are encountered. Thus, it was learned that certain of the filter dyes when discharged as stated, left objectionable residual stains. In addition, hydroxylamine and hydrazine solutions are highly poisonous and may produce dermatitis in extended use. Again hydroxylamine reacts readily with sulfite or hyposulfite and hence must be used as a separate bath, thereby introducing an extra step in the processing of the color film. Finally, the discharge agents mentioned in the prior application are not stable and would have to be replaced at least once a week.

I have now discovered, quite surprisingly, that the above objections to the discharge agents of my prior application are completely overcome by using selected yellow dyes within the ambit of said application and discharging such dyes by means of a bath containing an aliphatic or aralkyl primary amine. The advantages of this discovery are manifold as will appear from a consideration of the fact that such amine solutions are non-poisonous, are indefinitely stable and effect complete discharge of the dyes without residual stain. More important still is the fact that the aliphatic and aromatic-aliphatic amines may tolerate the presence of water soluble sulfites, thiosulfites, bromides and chlorides and hence may be used to effect dye discharge during fixing, bleaching, color development or the like. For practical purposes, I have found that it is most advantageous to add the amines employed for such discharge to the fixing bath.

The yellow dyes found to be effective for my purpose are yellow Schiff's bases made by condensing a sulfonated aromatic hydroxy aldehyde of the benzene or naphthalene series with a primary aromatic amine containing at least one water solubilizing sulfo or carboxy group. The utilization of such bases as colorants for filter and antihalation layers and the discharge of such bases by means of aliphatic and aralkyl primary amines constitute the purposes and objects of the present invention.

The yellow colorants, the utilization of which is contemplated herein, may be more aptly characterized by the following structural formula:

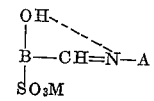

in which M is hydrogen or a salt forming group such as a radical of an alkaline metal, i. e., sodium, potassium, lithium or the like, or a secondary or tertiary amine such as trimethylamine, triethylamine, diethanolamine, morpholine, pyridine and the like, B is an aromatic radical of the benzene or naphthalene series such as 1-sulfo-4-hydroxyphenyl; 2-hydroxy-6-sulfonaphthyl; 1-hydroxy-4-sulfonaphthyl; 2 - sulfo - 6 - hydroxynaphthyl; 2-stearoylamino-1-sulfo-6-hydroxynaphthyl and the like and A is an aromatic radical containing a water solubilizing sulfo or carboxy group such as 1-sulfo-4-dodecoxyphenyl; 1-sulfo-4-octadecoxyphenyl; 1-sulfo-4-octadecylsulfonamidophenyl; 1-sulfo-2-methyl-3-stearoylamidophenyl; 1-sulfo-4-methyl-3-stearoylamidophenyl; 1-sulfo-4 - methyl - amino - 5 - stearoylaminophenyl; 1-sulfo-4-octadecyl-aminophenyl; 5-sulfo-1-octadecyl-2-phenylbenzimidazolyl; sulfo-phenyl; 1,3,6-trisulfo-naphthyl; 1-sulfo-naphthyl; 1-sulfo-6-carboxy-naphthyl; 1 - chloro-3-sulfonaphthyl; 1-methoxy - 4 - sulfo - napthyl; carboxy-phenyl; carboxynaphthyl and the like.

In the above compounds, the hydroxyl group is always in ortho position to the azomethine linkage. It has been found that the oxygen of this hydroxyl group is enolic in character since the hydrogen bond thereof is labile. This has been indicated in the above formula by the dotted lines running from the hydroxyl group to the nitrogen atom of the azomethine linkage.

In the event that the above class of Schiff's bases are to be used as filter rather than antihalation dyes, then it is essential that there be present in either radical A or B, a group which renders the dyes non-migratory in the colloidal carrier in which it appears. This result is best achieved by incorporating in the dyes, an alkyl chain of at least 10 carbon atoms.

Examples of dyes which I have found to be suitable and which are embraced by the foregoing formula are the following.

(1)

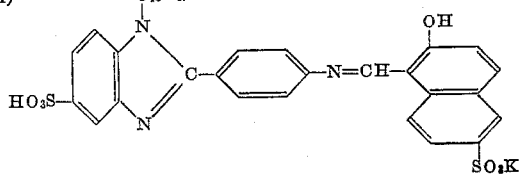

(2)

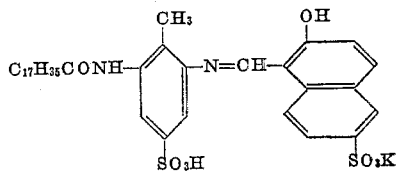

(3)

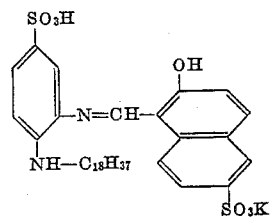

(4)

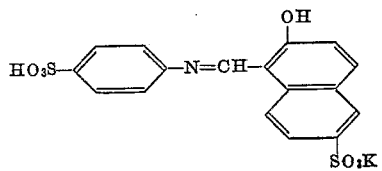

(5)

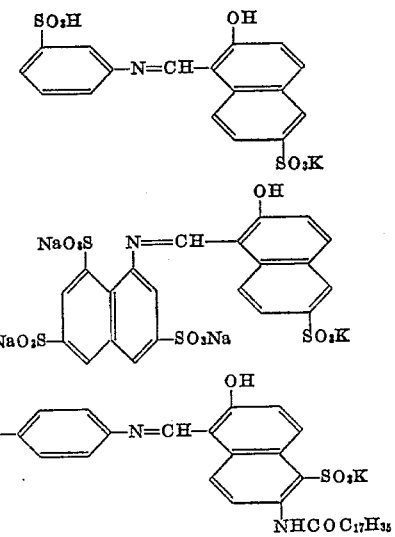

(6)

(7)

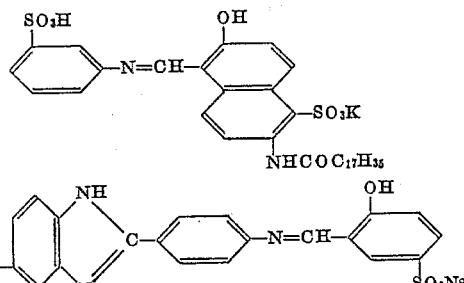

(8)

(9)

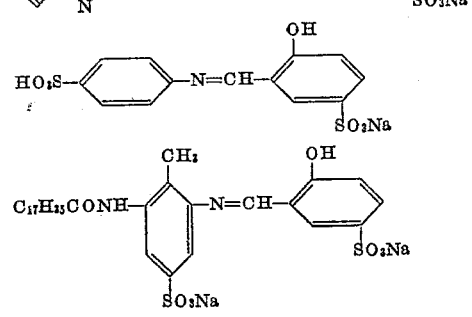

(10)

(11)

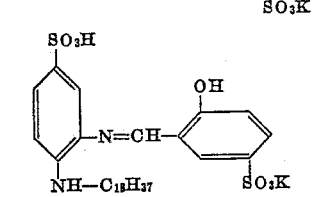

(12)

(13)

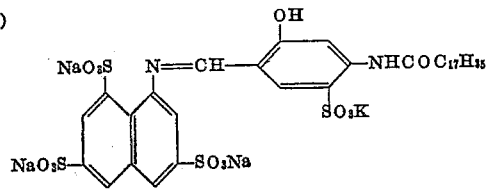

(14)

(15)

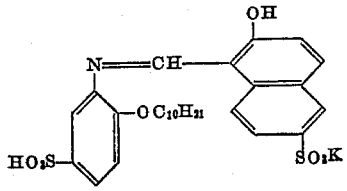

(16) 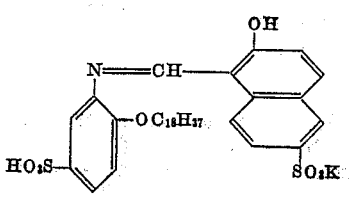

(17) 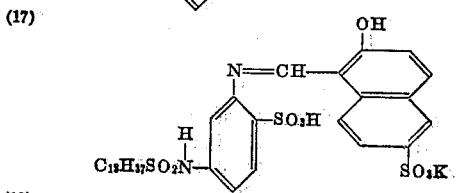

(18) 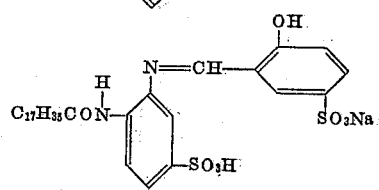

(19) 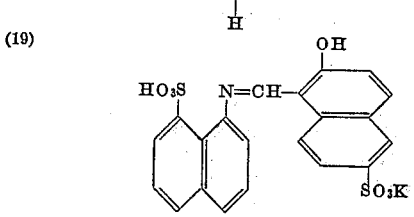

(20) 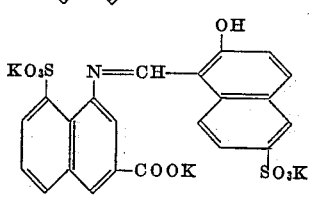

(21) 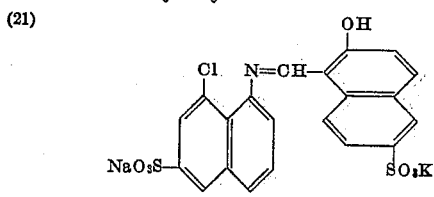

(22) 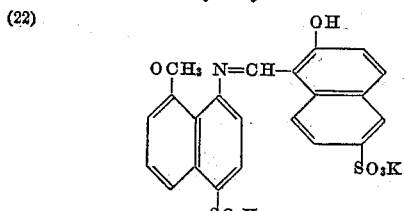

(23) 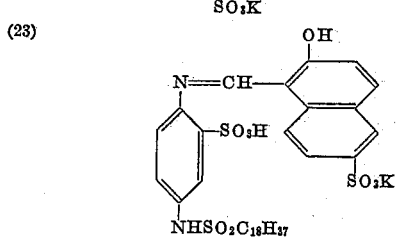

(24) 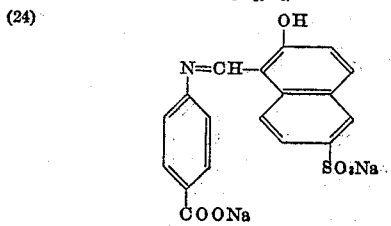

(25) 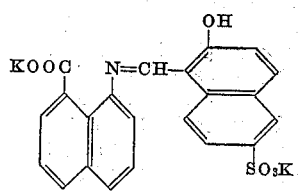

The above compounds are prepared by heating an ortho hydroxy aldehyde of the benzene or naphthalene series and bearing a sulfo group with a primary aromatic amine containing either a carboxy or sulfo group. Suitable aldehydes for the reaction are 2-hydroxy-benzaldehyde-5-sulfonic acid; 2-hydroxy-naphthaldehyde-6-sulfonic acid; 1-hydroxy-2-naphthaldehyde-4-sulfonic acid; 2-hydroxy-6-stearoylamino-naphthaldehyde-4-sulfonic acid; 6-hydroxy-5-formyl-naphthalene-2-sulfonic acid; 6-hydroxy-5-formyl-2-stearoylamino-naphthalene-1-sulfonic acid and the corresponding water soluble salts.

Examples of aromatic primary amines to be reacted with the aforesaid aldehydes are 2-dodecoxy-aniline-5-sulfonic acid; 2-octadecoxy-aniline-5-sulfonic acid; 5-octadecane-sulfonamido orthanilic acid; 4-methyl-5-stearamido-metanilic acid; 4-methylamino-6-stearoyl-metanilic acid; 4-octadecyl-amino-metanilic acid; 2-hydroxy(4'-aminophenyl)-1-octadecyl-benzimidazole-5-sulfonic acid; sulfanilic acid; β-anilic acid-1-amino-naphthalene; 3,6,8-trisulfonic acid; 1-amino-naphthalene-8-sulfonic acid; 4-amino-benzoic acid; 3-amino-benzoic acid; 1-amino-naphthalene-4-carboxylic acid; 1-amino-4-carboxy-naphthalene-8-sulfonic acid; 1-amino-8-chloro-naphthalene-6-sulfonic acid; 1-amino-8-methoxy-naphthalene-4-sulfonic acid and the corresponding water soluble salts.

Practically all of the parent materials for the dyes contemplated herein are described in the literature. Those which are not may be made by a relatively simple procedure. Thus the sulfonic acid derivative of 2-hydroxy-6-stearoyl-amino-naphthaldehyde is prepared by reducing 2-hydroxy-6-nitro-naphthaldehyde with an alkaline hyposulfite solution followed by treatment of the cooled mixture with stearoyl chloride. The aldehyde thus obtained is sulfonated with concentrated sulfonic acid at 50–60° C. for several hours.

The amines mentioned above and having long aliphatic chains are disclosed in the copending application Serial No. 43,756, filed by Joseph Sprung on August 11, 1948, entitled "Silver Halide Emulsions Containing Non-Diffusing Azo Dyes," now U. S. P. 2,629,658, dated February 24, 1953, or in Fiat Final Report No. 943.

The filter layers of the present invention (it being understood that the term "filter layers" is to be construed to include antihalation layers) are prepared by the incorporation of the dyes contemplated herein in a colloidal carrier therefor. As the carrier, there may be used the usual colloids such as gelatin, polyvinyl alcohol, copolymers of maleic anhydride with methylvinyl ether and the like. The dyes are soluble in water and hence may be incorporated in the carrier by adding to a water solution of the selected dyestuff, slowly and with agitation, a 10% aqueous solution of the desired colloid. Conversely, the dyes may be dissolved in water containing a little pyridine and such solutions used to dye a foil of the carrier. Should the foil be gelatin, it will be found that those dyes containing a long aliphatic chain are quite substantive to the gelatin.

As previously emphasized, one of the important features of the present application resides in the discovery that dyes constituted as above may be readily and completely discharged by means of an aqueous solution of a primary aliphatic amine such as methyl amine; ethyl amine; propyl amine; monohydroxyethyl amine; 1-amino-2-hydroxy-propane; 1-amino-2-hydroxy-butane; ethylene diamine; propylene diamine; polyethylene tetramine; cyclohexylamine; cyclobutyl amine and the like, or aralkyl primary amines such as benzylamine; β-phenylethyl amine; β-phenylpropyl amine and the like.

It is to be emphasized at this point that any aliphatic or aralkyl primary amine may be used providing that the amine dissolves in water to a certain extent. Preferably, the discharge bath comprises a 1–10% aqueous solution of the selected amine.

It has been noted previously that the aliphatic or aralkyl primary amines may tolerate the presence of solutions of water soluble salts containing sulfite, thiosulfite, bromide or chloride groups. Accordingly, the amines may be incorporated in one of the usual processing baths and I have found it most advantageous to add the amines to the fixing bath. A suitable bath for such purpose would be constituted as follows:

| | | |
|---|---|---|
| Sodium thiosulfate | gms | 200 |
| An alkali | gms | 0–50 |
| An amine as indicated above | cc | 10–100 |

Water to make 1000 cc.

The following examples serve to illustrate the invention but it is to be understood that the invention is not restricted thereto. Parts are by weight unless otherwise stated.

SECTION I

PREPARATION OF DYES

Example 1

Into a container equipped with a mechanical agitator and a reflux condenser there are introduced 200 parts of pyridine, 120 parts of glacial acetic acid and 2 parts of the potassium salt of 6-hydroxy-5-formyl-naphthalene-2-sulfonic acid. The mixture is then heated just to the reflux point. An intimate mixture of 1-octadecyl-2-(4'-aminophenyl)benzimidazole-5-sulfonic acid (27 parts, 30 mesh) and the potassium salt of 6-hydroxy-5-formyl-naphthalene-2-sulfonic acid (15 parts, 30 mesh) is rapidly introduced. The resulting suspension is refluxed with agitation for 1 hour. A solution of 5 parts of sodium acetate in 20 parts of glacial acetic acid is introduced and the mixture refluxed for another ½ hour. The mixture is maintained at 95° C. for another ½ hour and the insoluble material is collected by filtration. The so-obtained yellow filter dye is washed with pyridine acetate and further with methanol. The washed cake is dried and the dye is used without further purification.

Example 2

The procedure is the same as in Example 1 excepting that 2-amino-5-stearoyl-aminotoluene-4-sulfonic acid is substituted for the benzimidazole derivative of Example 1.

Example 3

The procedure is the same as in Example 1 excepting that 4-octadecyl-amino-metanilic acid is substituted for the benzimidazole derivative of Example 1.

Example 4

The procedure is the same as in Example 1 excepting that sulfanilic acid is condensed with the potassium salt of 6-hydroxy-5-formyl-naphthalene-sulfonate in equimolecular quantities. This product is useful as an antihalation dye.

Example 5

The procedure is the same as in Example 1 excepting that metanilic acid is condensed with the potassium salt of 6-hydroxy-5-formyl-naphthalene-2-sulfonate in equimolecular amounts. A valuable antihalation dye is thus produced.

Example 6

The procedure is the same as in Example 1 excepting that the trisodium salt of 1-amino-naphthalene-3,6,8-trisulfonic acid is condensed with the potassium salt of 6-hydroxy-5-formyl-naphthalene-2-sulfonic acid in equimolecular amounts. This product is also useful as an antihalation dye.

Example 7

The procedure is the same as in Example 1 excepting that the potassium salt of 6-hydroxy-5-formyl-2-stearoyl-amino-naphthalene-1-sulfonic acid is condensed with sulfanilic acid in equimolecular amounts.

Example 8

The procedure is the same as in Example 1 excepting that potassium salt of 6-hydroxy-5-formyl-2-stearoylamino-naphthalene-1-sulfonic acid is condensed with metanilic acid in equimolecular amounts.

Example 9

The procedure is the same as in Example 1 excepting that 2-hydroxy-benzaldehyde-5-sulfonic acid is substituted for the aldehyde of Example 1.

Example 10

The procedure is the same as in Example 3 excepting that the aldehyde employed is 2-hydroxy-benzaldehyde-5-sulfonic acid.

Example 11

To a solution of 1 mole of the potassium salt of 6-hydroxy-5-formyl-naphthalene-2-sulfonic acid in a minimum quantity of boiling acetic acid are added 3 moles of pyridine and slightly less than 1 mole of 8-amino-naphthalene-1-sulfonic acid. The mixture is boiled for 3 to 5 minutes an then added to a large volume of ethyl ether. The precipitated dye is recovered by filtration, washed with acetone and used without further purification.

Example 12

A mixture of the potassium salt of 8-amino-6-carboxy-naphthalene-1-sulfonic acid (1 part), the potassium salt of 6-hydroxy-5-formyl-naphthalene-2-sulfonic acid (1 part), pyridine (1 part) and methanol (50 parts by volume) was refluxed for 3 hours and then cooled to 0° C. The precipitated dye was removed by filtration, washed with methanol, dried and used without further purification.

SECTION II

Preparation of Dye Solutions and Filter Layers

Example 13

600 milligrams of the dye of Example 1 were dissolved in 40 parts of water containing a small amount of pyridine. To the resulting solution was added slowly and with agitation, 20 cc. of 10% aqueous gelatin solution. The mixture was maintained at 40° C. until used for coating.

Example 14

The procedure is the same as in Example 13 excepting that there is used the dyestuff of Example 12.

SECTION III

Fixing and Discharge Bath

Example 15

The following solution serves as a combined yellow filter dye bleach and fixing bath:

| | |
|---|---|
| Sodium thiosulfate | gms__ 200 |
| Sodium metaborate | gms__ 25 |
| Ethanol amine | cc__ 15 |
| Water to make 1000 cc. | |

Example 16

The following solution serves as a combined filter dye bleach and fixing solution:

| | |
|---|---|
| Sodium thiosulfate | gms__ 200 |
| Sodium carbonate | gms__ 20 |
| Benzylamine | cc__ 12 |
| Water to make 1000 cc. | |

Example 17

The following solution serves as a combined yellow filter dye bleach and fixing bath:

| | |
|---|---|
| Sodium thiosulfate | gms__ 200 |
| Trisodium phosphate | gms__ 30 |
| Phenethyl amine | cc__ 15 |
| Water to make 1000 cc. | |

SECTION IV

Preparation of Multilayer Film

Example 18

A red sensitized silver bromide emulsion containing a phenolic color former fast to diffusion was coated upon a base and over this is cast a green sensitive silver bromide emulsion containing a pyrazolone color former fast to diffusion. Over the green sensitive layer is cast a filter layer prepared from the solution of Example 13. Over the filter layer is cast a blue sensitive emulsion containing an acetoacetanilide color former fast to diffusion.

Example 19

The procedure is the same as in Example 18 excepting that the filter layer is prepared from the solution of Example 14.

SECTION V

Film Processing

Example 20

Film prepared according to Example 18 is exposed, developed in a black and white developer, washed, re-exposed and developed in a p-diethylaminoaniline developer. The film is then bleached and fixed in the solution of Example 15 after which it is shortstopped and immersed in a 50% sodium bicarbonate solution, washed and dried. It will be found that the yellow filter layer has been completely removed and that no yellow stains remain.

Example 21

The procedure is the same as in Example 20 excepting that the fixing is effected with the bath of Example 16.

Example 22

The procedure is the same as in Example 20 excepting that the fixing is effected with the bath of Example 17.

Modifications of the invention will occur to persons skilled in the art. Thus it is evident that any of the aldehydes mentioned above may be combined with any of the amines to form satisfactory yellow colorants for filter or antihalation layers. Similarly, while the examples are directed to the use of the colorants in forming filters in color photography, it is to be understood that the colorants may be used to form filters and antihalation layers for black and white film. Finally, while the examples specify the use of the amines in the fixing bath, it is to be understood that they may also be used if so desired in the bleaching or color development baths.

I, therefore, do not intend to be limited in the patent granted except as required in the appended claims.

I claim:

1. In the processing of an exposed light sensitive photographic element comprising a base and a light sensitive silver halide emulsion layer and including a water soluble colloid dyed with an irreversibly dischargeable Schiff's base of the following formula:

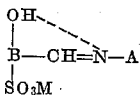

in which B is an aromatic radical selected from the class consisting of those of the benzene and naphthalene series, A is an aromatic radical containing a group selected from the class consisting of sulfo and carboxy groups, M is selected from the class consisting of hydrogen and salt forming radicals and the hydroxyl group is ortho to the azomethine linkage, the improvement which comprises discharging said Schiff's base by subjecting the photographic element to the action of an aqueous solution of a primary amine selected from the class consisting of aliphatic and aralkyl amines.

2. In the processing of an exposed light sensitive photographic element comprising a base and a light sensitive silver halide emulsion layer and including a water soluble colloid dyed with an irreversibly dischargeable Schiff's base of the following formula:

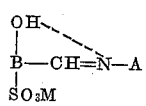

in which B is an aromatic radical selected from the class consisting of those of the benzene and naphthalene series, A is an aromatic radical containing a group selected from the class consisting of sulfo and carboxy groups, M is selected from the class consisting of hydrogen and salt forming radicals and the hydroxyl group is ortho to the azomethine linkage, the improvement which comprises discharging said Schiff's base by subjecting the photographic element to the action of a fixing bath containing a primary amine selected from the class consisting of aliphatic and aralkyl amines.

3. The process as defined in claim 1 wherein the Schiff's base contains an aliphatic radical of at least 10 carbon atoms designed to render it non-migratory in the colloid in which it appears.

4. The process as defined in claim 2 wherein the Schiff's base contains an aliphatic chain of at least 10 carbon atoms to render it non-migratory in the colloid in which it appears.

5. In the processing of an exposed multilayer photographic material containing three light sensitive silver halide emulsion layers sensitized respectively to the red, green and blue regions of the spectrum and having interpolated between the green and blue sensitive layers, a filter layer comprising a water soluble colloid dyed with an irreversibly dischargeable Schiff's base of the formula

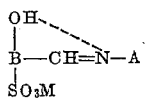

in which B is an aromatic radical selected from the class consisting of those of the benzene and naphthalene series, A is an aromatic radical containing a group selected from the class consisting of carboxy and sulfo groups, M is selected from the class consisting of hydrogen and salt forming radicals and the hydroxyl group is ortho to the azomethine linkage, the improvement which comprises discharging said base by subjecting the photographic material to the action of an aqueous solution of a primary amine selected from the class consisting of aliphatic and aralkyl amines.

6. The process as defined in claim 5 wherein the primary amine is located in the fixing bath.

7. The process as defined in claim 5 wherein the Schiff's base contains an aliphatic chain of at least 10 carbon atoms designed to render it non-migratory in the colloid in which it appears.

8. A photographic fixing and bleaching bath containing as the essential components an aqueous solution of sodium thiosulfate, an alkali, and a primary amine selected from the class consisting of aliphatic and aralkyl amines.

9. A photographic fixing and bleaching bath containing as the essential components an aqueous solution of sodium thiosulfate, sodium metaborate and ethanol amine.

10. A photographic fixing and bleaching bath consisting of sodium thiosulfate (200 parts), an alkali ranging from 0–50 parts, and an aliphatic primary amine ranging from 10–100 parts by volume, the balance being water.

References Cited in the file of this patent

UNITED STATES PATENTS

| Number | Name | Date |
|---|---|---|
| 2,078,398 | Mannes | Apr. 27, 1937 |

FOREIGN PATENTS

| Number | Country | Date |
|---|---|---|
| 571,389 | Great Britain | Aug. 22, 1945 |